United States Patent [19]

Kikuchi et al.

[11] 4,112,175
[45] Sep. 5, 1978

[54] SOUND INSULATING SHEET CONTAINING LEAD FIBERS

[75] Inventors: Yoshikazu Kikuchi; Hirotsugu Suzuki; Kenji Yabe, all of Otsu, Japan

[73] Assignee: Toray Industries, Inc., Tokyo, Japan

[21] Appl. No.: 746,319

[22] Filed: Dec. 1, 1976

Related U.S. Application Data

[63] Continuation-in-part of Ser. No. 481,401, Jun. 20, 1974, abandoned.

[51] Int. Cl.² ............................................. B32B 5/02
[52] U.S. Cl. .................................... 428/236; 428/246; 428/253; 428/285; 428/297; 428/302; 428/409
[58] Field of Search ............. 428/242, 288, 296, 297, 428/280, 281, 911, 409, 233, 236, 237, 245, 253, 285, 379; 156/62.2, 62.4; 264/257, 259, 111, 126, 128, 129

[56] References Cited

U.S. PATENT DOCUMENTS

| | | | |
|---|---|---|---|
| 3,184,368 | 5/1965 | Juras | 428/242 |
| 3,253,947 | 5/1966 | McCluer et al. | 428/242 |
| 3,410,936 | 11/1968 | Juras | 264/111 |
| 3,556,914 | 1/1971 | Juras | 428/297 |
| 3,622,432 | 11/1971 | McCluer et al. | 428/242 |
| 3,719,538 | 3/1973 | Carlson et al. | 428/297 |
| 3,767,505 | 10/1973 | Coran et al. | 428/280 |
| 3,973,059 | 8/1976 | Brown et al. | 428/296 |
| 3,976,728 | 8/1976 | Hawthorne | 264/128 |

Primary Examiner—James J. Bell
Attorney, Agent, or Firm—Haseltine, Lake & Waters

[57] ABSTRACT

A nonporous flexible sound insulating sheet is provided which is composed of 50 to 90 wt.% of a nonwoven lead fiber fabric and 10 to 50 wt.% of a vinyl chloride polymer reinforcing material. The reinforcing material fills the spaces between individual lead fibers of the nonwoven fabric to secure the individual lead fibers in their places. The lead fibers are substantially uniformly distributed in the nonwoven fabric and are disposed such that the axes of the lead fibers extend, as a whole, substantially at random in all directions, and such that the lead fibers are not exposed on the surface of the sound insulating sheet. The sound insulation sheet has a thickness of 0.3 to 2.0 mm and a specific gravity of 2.0 to 6.5.

5 Claims, 8 Drawing Figures

SOUND INSULATING SHEET CONTAINING LEAD FIBERS

This is a continuation-in-part of application Ser. No. 481,401, filed June 20, 1974 now abandoned.

This invention relates to flexible sound insulating sheets composed of lead fibers and a vinyl chloride polymer reinforcing material.

Among public nuisances, noise problems are most prevalent and difficult to overcome. Noises from industrial plants, construction sites, vehicles and other sources have been increasing in recent years. Although various means and materials to control noise have been proposed, there have been no satisfactory, versatile materials for sound controlling purposes.

For example, metal sheets have been used as sound insulators. Metals such as steel and aluminum cannot be good sound insulators because the metal sheet is liable to resonate with sound waves and vibrate, creating secondary sound waves.

Thick curtains of cloth and/or artificial leather, for example, made of polyvinyl chloride have also been employed for sound insulating purposes, but are not adequately effective.

From a purely accoustical point of view, lead is the most suitable material as a sound insulator because of its high density and low rigidity. Unfortunately, lead has a disadvantage: it is not rigid enough to be used alone as a partition and it must be combined with plywood, slate or other supporting members resulting in reduction of flexibility. Lead powder is also used to make a heavy sheet or plate. In this case, since a lead powder impregnated sheet or plate behaves as a single homogeneous material for sound waves, effectiveness as a sound insulator is at most to the degree expected from the Mass Law.

In general, flexible sound insulating sheets possessing the following characteristics are most preferred.

(1) Sheets which exhibit satisfactory sound insulation in spite of their thin thicknesses, and good absorption of vibrations.

(2) Sheets which are capable of being easily cut into a desired shape and size for installation purposes, and which are flexible enough for being tightly fit into any complicated installation sites.

(3) Sheets which have high tensile and tear strengths, and which are transparent or translucent for promotion of good lighting. These characteristics are most preferred particularly when such sheets are to be used in the fields of construction, building or engineering.

(4) Additionally, sheets which are noncombustible, weather-resistant, heat-resistant and, in some cases, attractive in appearance.

However, sound insulation sheets possessing all of these characteristics have not heretofore been proposed.

It is an object of the present invention to provide sound insulating sheets for a variety of sound insulating purposes, which possess the above-listed characteristics.

Other objects and advantages will be apparent from the following description.

In accordance with the present invention, there is provided a nonporous flexible sound insulating sheet composed of 50 to 90% by weight of a nonwoven lead fiber fabric and 10 to 50% by weight of a vinyl chloride polymer reinforcing material, said reinforcing material filling the spaces between individual lead fibers of the nonwoven fabric to secure the individual lead fibers in their places, said lead fibers being substantially uniformly distributed in the nonwoven fabric and being disposed such that the axes of the lead fibers extend, as a whole, substantially at random in all directions, and such that the lead fibers are not exposed on the surface of the sound insulation sheet, said sound insulating sheet having a thickness of from 0.3 to 2.0 mm and a specific gravity of from 2.0 to 6.5.

The term "lead" used herein refers not only to pure lead, but also to alloys consisting essentially of at least 90% by weight of lead and not more than 10% by weight of tin and/or antimony. These alloys are advantageous over pure lead in that they do not readily form rust. Therefore, variances in the color of the nonwoven fabric lots do not occur during the course of manufacturing; thereby the sound insulating sheets are uniform in appearance. The amount of tin and/or antimony is generally from 0.01 to 10% by weight, more preferably from 0.02 to 5% by weight, based on the weight of the alloy. Pure lead is liable to rust due to its contact with moisture and oxygen before and during the superposing of a vinyl chloride polymer sheet onto a nonwoven fabric of lead fibers; and therefore, a variance in the color of the fabric lots tends to exist. However, a nonwoven fabric of pure lead fibers may conveniently be used, for example, when it is combined with an opaque vinyl chloride polymer sheet or when a surface layer such as a knitted or woven fabric, another nonwoven fabric, an opaque polymer film or a metal foil is superposed on the vinyl chloride polymer-impregnated nonwoven fabric.

The nonporous flexible sound insulating sheet of the invention has a structure wherein a vinyl chloride polymer utilized as a reinforcing material fills the spaces between individual lead fibers of the nonwoven fabric to secure the individual lead fibers into place.

The sound insulating sheet of the invention will be illustrated with reference to the accompanying drawings, in which.

Figure 1A:
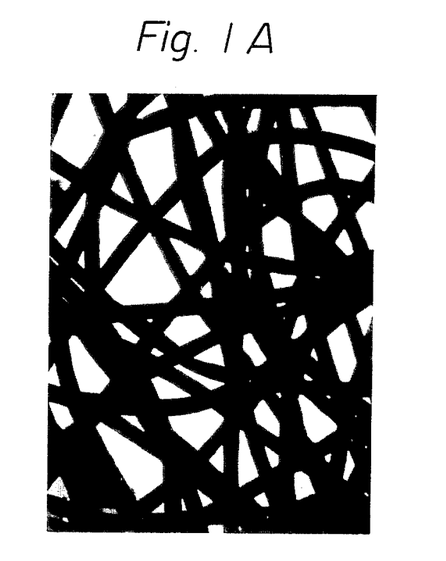
FIG. 1A is an enlarged plan view (photograph) of a part of the sound insulation sheet of the invention.
Figure 1B:
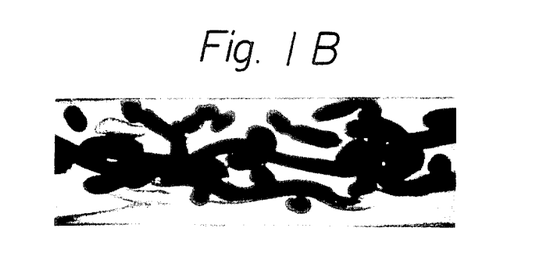
FIG. 1B is an enlarged sectional view (photograph) of a part of the sound insulation sheet of the invention.

As seen in FIGS. 1A and 1B, the lead fibers shown by black thick lines in the photographs are substantially uniformly distributed over the entire area and the thickness of the sound insulation sheet. The portions shown in white in the photographs represent the vinyl chloride polymer fillings between the spaces of the individual lead fibers. The vinyl chloride polymer fillings are usually transparent. The lead fibers are disposed at random, i.e., in a manner such that the axes of the lead fibers extend, as a whole, substantially at random in all directions, and such that the lead fibers are not exposed on the surface of the sound insulation sheet. Such uniform distribution and random disposition serve to provide an improved and uniform sound insulation capacity in the sheet. Further, the sound insulating sheet is flexible enough for being tightly fit into any complicated installation sites. In addition, due to the fact that the vinyl chloride polymer fillings secure the individual lead fibers well into their places, the sheet exhibits good tensile strength and tear strength. Furthermore, the sound insulation sheet is not harmful to human health because the lead fibers are not exposed on the surface and cannot cause any direct bodily contact. In addition, the sound sheet has a smooth surface and an attractive appearance due to the lead fibers being unexposed on the surface.

The lead fiber may be of any shape, for example, it may not only be circular but also oval or approximately square in cross section. No uniformity in shape and thickness along the fiber axis is required. The lead fibers should preferably possess an average length of approximately from 0.5 to 100 cm, preferably from 5 to 15 cm. When the average fiber length is more than the upper limit, the uniform distribution of the fibers in the nonwoven fabric is poor. In contrast, fibers having an average length less than the lower limit are poor in their interlacement, and hence do not provide a nonwoven fabric of the desired uniformity and mechanical strengths. The fiber length may conveniently be varied, for example, by selecting the composition of the lead alloy and the conditions under which molten lead is to be extruded into fibers, such as the extrusion temperature, extrusion pressure, and shape and size of the extrusion orifices. Further, the lead fibers should preferably possess a diameter of 30 microns to not more than 500 microns, more preferably 30 microns to not more than 200 microns. By the term "diameter" used herein is meant twice of "$r$" given by the formula: $S = \pi r^2$, where $S$ = cross-sectional area of the fiber.

The content of the lead fibers in the vinyl chloride polymer-impregnated nonwoven fabric sheet should be approximately 50% to approximately 90% by weight. The sheet having such lead fiber content usually possesses a specific gravity of approximately 2 to approximately 6.5.

Figure 2:
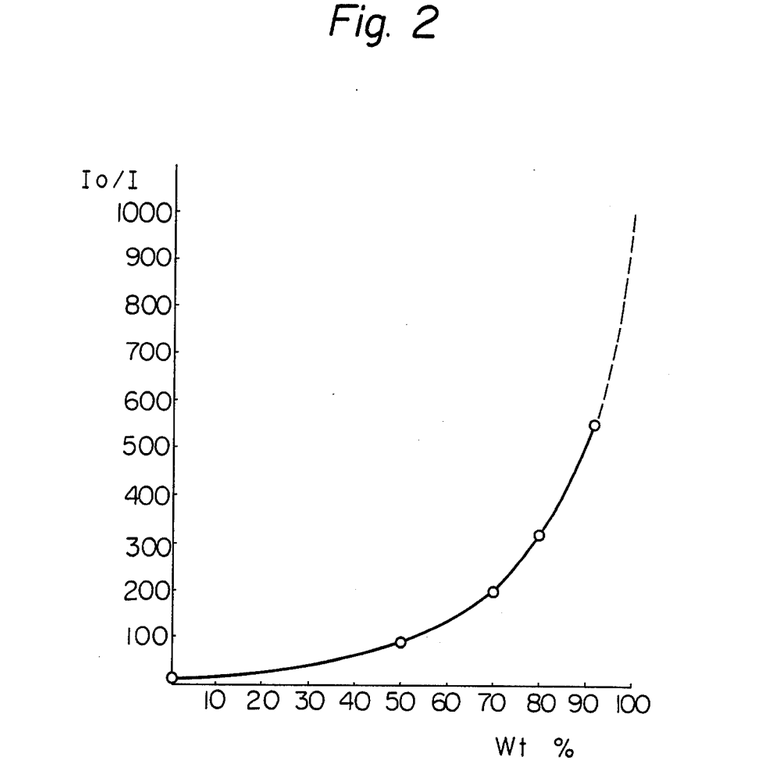
FIG. 2 shows the relationship between the sound insulation effect expressed in terms of $I_o/I$ and the content of lead fibers in the sound insulation sheet.

FIG. 2 shows the relationship between the content of lead fibers in one example of the polyvinyl chloride-impregnated nonwoven fabric sheet of the invention which has a thickness of 1 mm, and the sound insulation effect expressed in terms of the ratio of $I_o/I_t$, where $I_o$ is the intensity of a sound impinging on the nonwoven fabric sheet and $I_t$ is the intensity of a sound passing through the non-woven fabric. As seen from FIG. 2, the sound insulation is poor when the lead fiber content is smaller than approximately 50% by weight. When the lead fiber content is in excess of approximately 50% by weight, the sound insulation is at a satisfactory level and increases sharply with an increase of the lead fiber content. When the lead fiber content exceeds approximately 90%, the sound insulation is satisfactory provided the resin-impregnated sheet has been sufficiently pressed to provide little or no spaces between the individual fibers. However, when said content is in excess of approximately 90%, it is hard to distribute the vinyl chloride polymer uniformly over the entire area and thickness of the nonwoven fabric. Therefore, the resin-impregnated sheet is completely poor in mechanical properties and not easy to handle.

The vinyl chloride polymer-impregnated nonwoven fabric should possess a thickness of 0.3 to 2 mm for attaining the desired sound insulation effect and flexibility. If the sheet is too thick, the sheet will be poor in flexibility and difficult to handle particularly in the field of construction, for example, in the case where the sheet is wrapped around a duct or tube. Further the greater the thickness, the harder it is to prepare a sheet with uniform thickness. In contrast, if the sheet is too thin, the sound insulation effect will not be satisfactory.

The vinyl chloride polymer used may be either a homopolymer or a copolymer containing a small proportion, usually 20% by weight or less, of a copolymerizable monoethylenically unsaturated monomer such as acrylic acid, methacrylic acid, maleic acid or alkyl esters of these acids, vinyl acetate, vinylidene chloride or acrylonitrile. The vinyl chloride polymer should preferably possess an average polymerization degree of 800 to 1,400 and should preferably contain 20 to 50% by weight of a plasticizer incorporated therein, i.e., a conventional non-rigid vinyl chloride polymer resin. The vinyl chloride polymer may contain small amounts of additives such as stabilizers, fillers, colorants, flame retardants, lubricants, ultraviolet absorbers and the like.

The vinyl chloride polymer resin is advantageous in the following points. (1) The vinyl chloride polymer readily penetrates into the nonwoven lead fiber fabric and fills the spaces between the individual lead fibers, for example, when a superposed product comprised of the nonwoven fabric and one or more vinyl chloride polymer sheets is heat-pressed or when a vinyl chloride polymer compound is applied onto the nonwoven fabric by using a calender. (2) The vinyl chloride polymer resin is flame- or fire-retardant, and therefore, the sound insulation sheet has increased safety from the standpoint of fire protection. (3) The vinyl chloride polymer resin sheet is flexible and easy to handle during installations. The flexibility of the polymer may be varied depending upon the amount and the type of the plasticizer used. (4) The vinyl chloride polymer resin is weather-resistant and heat-resistant, and therefore, the sound insulation sheet has a long service life. In addition, the sound insulation sheet has an attractive appearance due to the transparency of the vinyl chloride polymer resin.

Figure 3:
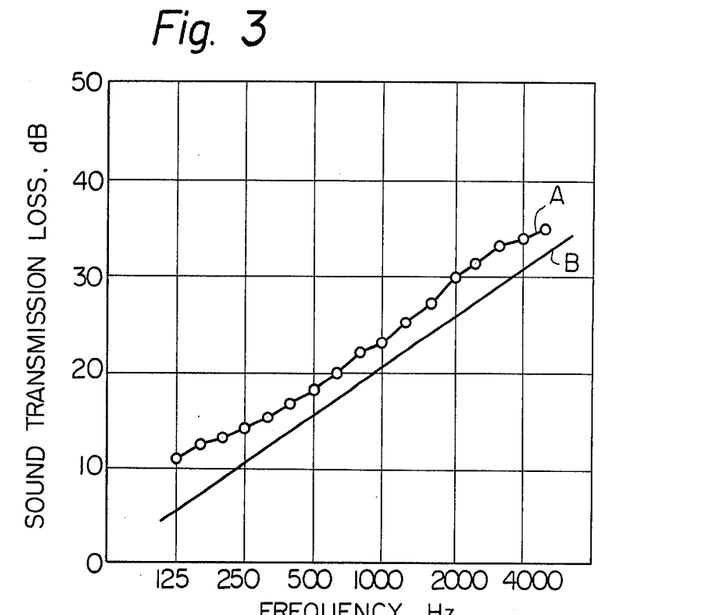
FIG. 3 shows the relationship between the sound transmission loss (dB) and the frequency (Hz)

FIG. 3 shows the superiority in the sound insulation effect of the resin-impregnated sheet of the invention. In FIG. 3, curve A designates the sound transmission loss (dB) of the resin-impregnated sheet prepared in Example 1 hereinafter illustrated and line B designates the sound transmission loss (dB) expected from the Mass Law. Sound insulation by a lead powder-impregnated polymer sheet is at most approximately equal to the value expected by the Mass Law, which may also be said of an insulating partition composed solely of a lead sheet, becuase the lead powder-impregnated polymer sheet behaves as a homogeneous system when sound waves travel therethrough. In contrast, the sound transmission loss of the insulating sheet of the present invention is greater than that expected from the Mass Law, as shown in FIG. 3. The reason why the insulating sheet of the present invention is not in accordance with the Mass Law is not clear yet, but it is presumed that the heterogeneous structure containing the lead fibers in view of the magnitude of sound wavelength causes energy loss of the travelling sound waves within the insulating sheet material.

A method for manufacturing the vinyl chloride polymer-impregnated sheet of the invention will be illustrated with reference to FIGS. 4, 5, 6 and 7.

Figure 4:
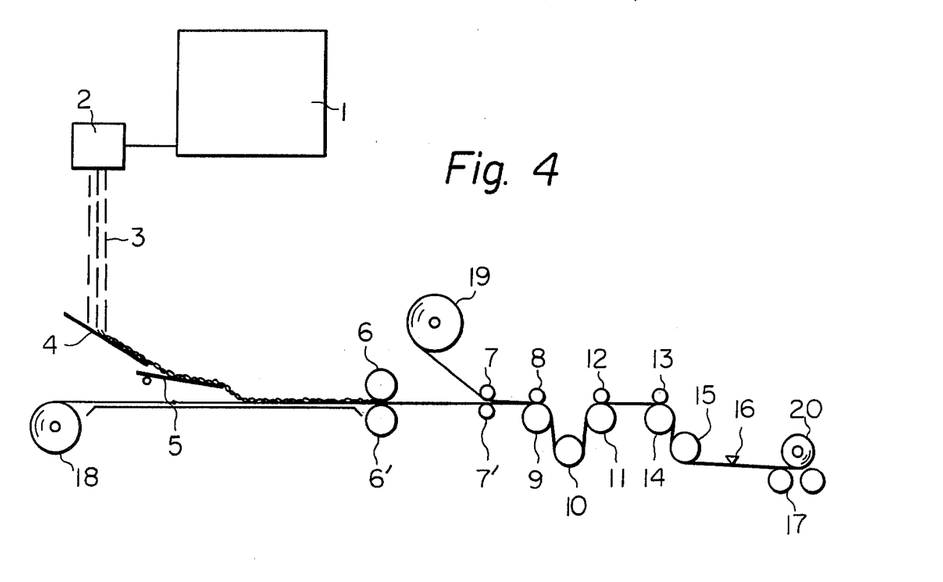
FIG. 4 is a diagrammatical view showing the process for preparing the sound insulating sheet of the invention.

In FIG. 4, lead melted in a melting vessel 1 is introduced into a spinblock 2 provided with a spinneret having orifices, from which the molten lead is extruded into the atmosphere. The extrudate is in the form of a bundle of fibers 3. The distribution of fiber length may suitably be varied by selecting the extrusion conditions or the composition of a lead alloy. It is preferable that air is blown transversely against the bundle of the lead fibers immediately below the spinneret. The bundle of the fibers falls directly onto a first slanting guide plate 4 which is oscillating transversely. The fibers, then fall from the first slanting guide plate 4 onto a second slanting guide plate 5; whereby the fibers are made into a web of a zig-zag configuration on the second slanting guide plate 5. Then, the web so formed is shaken by said plate, and thereafter, falls from said plate 5 onto a vinyl chloride polymer sheet withdrawn from a roll 18. The lead fiber web and the vinyl chloride polymer sheet are pressed together by a pair of rollers 6 and 6'. Another vinyl chloride polymer sheet withdrawn from a roll 19 is superposed on the vinyl chloride polymer combined lead fiber web by a pair of rollers or guide bars 7 and 7', and, then, the superposed product is heated by heating rollers 9, 10, 11 and 12, thereby impregnating the lead fiber web with vinyl chloride polymer. Then, the resin-impregnated web is pressed by a pair of rollers 13 and 14 and cooled by the roller 14 and roller 15, through which cold water was circulated. The cooled web is cut into the desired width and length by a cutter 16, and then wound into a roll 20 on rollers 17.

The temperature of the rollers 9, 10, 11 and 12 may be set usually within the range of 120° to 180° C. If desired, other heating means such as an electric heater and an infrared ray heater may be employed in addition to these rollers 9, 10, 11 and 12.

The steps of heat-pressing and then cold-pressing the polyvinyl chloride-combined web are important for the purpose of causing the vinyl chloride polymer fill the spaces between the individual fibers of the web for securing the individual fibers in place.

Figure 5:
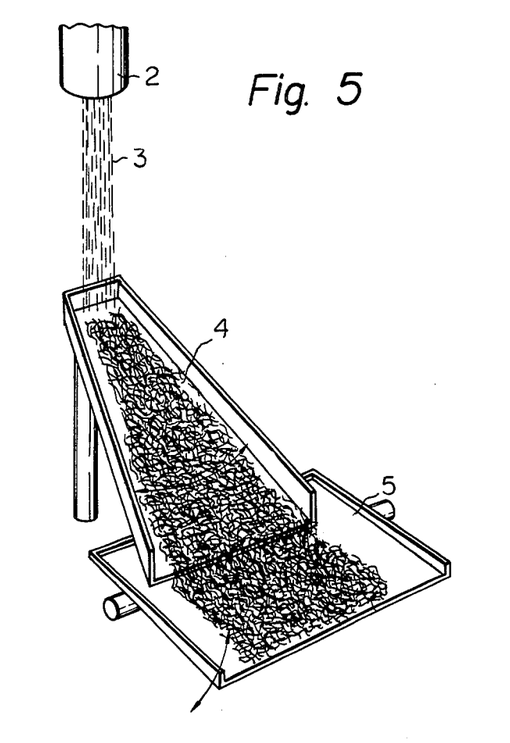
FIG. 5 is an enlarged schematical view of an inclined guide plate device used in the process shown in FIG. 4.

The first slanting guide plate 4 and the second slanting guide plate 5 are schematically shown in FIG. 5. The first slanting guide plate 4 is swung in the transverse direction whereby the bundle of lead fibers is spread and made to be of a zig-zag configuration. The spread bundle of lead fibers in the form of a web is shaken from said plate 4 onto the second slanting guide plate 5. At least the downstream end of the second slanting guide plate 5 is swung in the vertical direction, and the lead fiber web is again shaken from said plate 5 onto a vinyl chloride sheet. Thus, the individual lead fibers are substantially uniformly distributed in the web and disposed such that the axes of the lead fibers extend, as a whole, substantially at random in all directions in the web.

Figure 6:
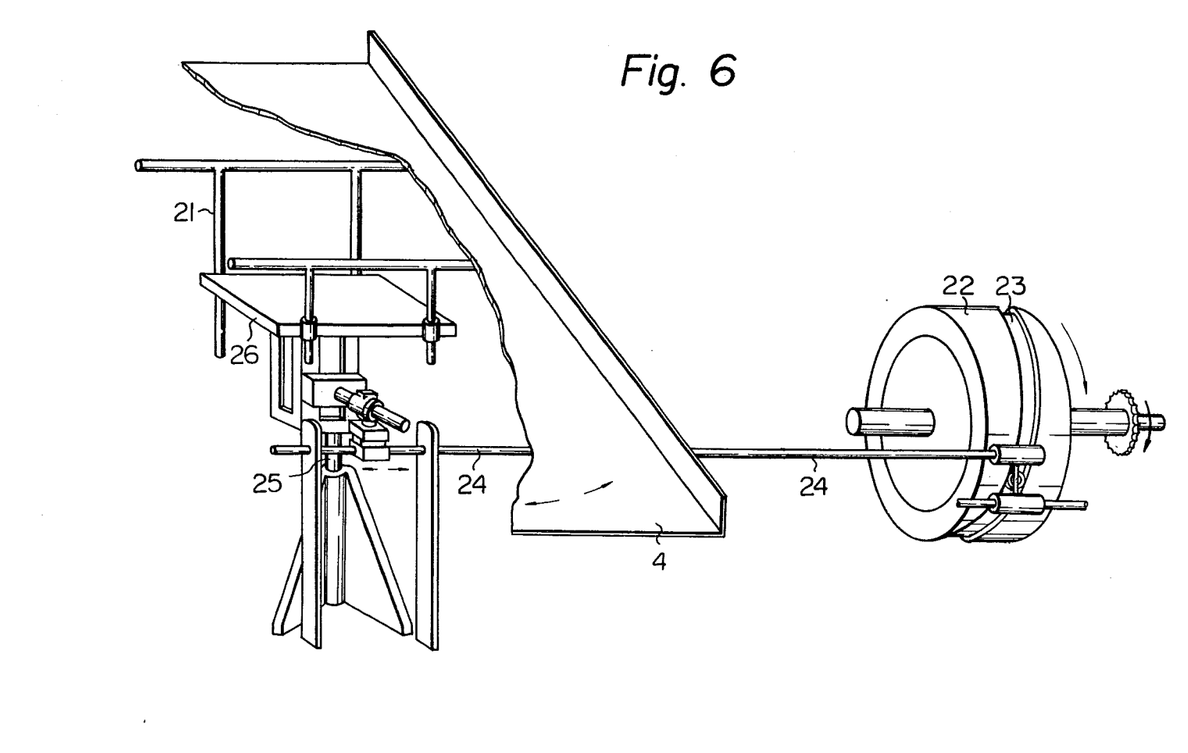
FIG. 6 is a schematical view of a mechanism for causing a first slanting guide plate to swing in the transverse direction.

In order to swing the first and second slanting guide plates 4 and 5, conventional mechanisms may be employed. For example, the first and second slanting guide plates 4 and 5 are swung by using mechanisms shown in FIGS. 6 and 7, respectively. In FIG. 6, a rotational movement produced by a motor (not shown) is changed to a linear reciprocal movement of a shaft 24 by a cam 22 having a groove 23. The linear reciprocal movement of the shaft 24 causes a plate 26 to rotate alternately in the clockwise and counterclockwise directions around an axis shaft 25. The alternate rotation of the plate 26 causes the slanting guide plate 4 via supports 21 to swing in the transverse direction of the web.

Figure 7:
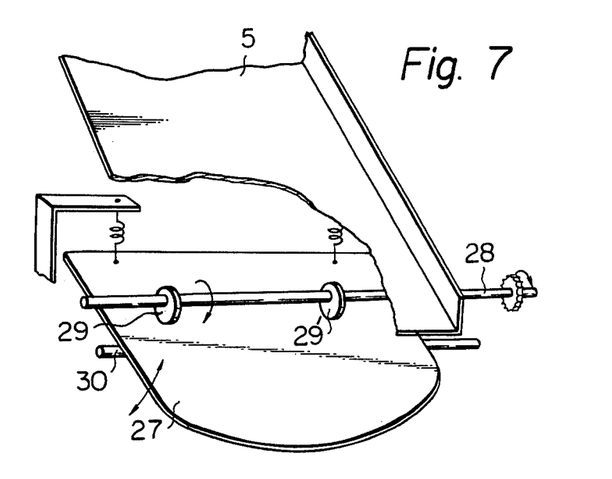
FIG. 7 is a schematic view of a mechanism for causing a second slanting guide plate to swing in the vertical direction.

In FIG. 7, shaft 28 rotated by a motor (not shown) is provided with circular plates 29 and 29' eccentrically fitted thereto. The rotational movement of the shaft 28 causes a plate 27 to swing on an axis 30. Thus, the second slanting guide plate 5 supported on the plate 27 is swung, i.e., the downstream end of the second slanting guide plate 5 is swung upward and downward to a great extent.

The nonporous flexible sound insulating sheet of the invention may comprise, in addition to a layer of the abovementioned vinyl chloride polymer-impregnated nonwoven lead fiber fabric, one or more supplemental layers of a knitted fabric, a woven fabric, a nonwoven fabric or a metal foil. These supplemental layers are adherent to either one side or both sides of said layer of the vinyl chloride polymer-impregnated nonwoven lead fiber fabric. Such supplemental layers serve to improve the mechanical properties, such as tensile strength and tear strength, of the resulting sound insulating sheet. Therefore, the insulation sheet having such supplemental layer or layers can be used, for example, in a manner such that the sound insulation sheet is suspended from a height of several tens, of meters in the field of construction. Further, the supplemental layers serve to modify or improve other properties of the sound insulating sheet such as weather resistance, thermal resistance, inflammability and chemical resistance.

The sound insulating sheet having the above-mentioned supplemental layer or layers may be manufactured by a process similar to that explained with reference to FIGS. 4 through 7. In the process for the manufacture of the insulating sheet having the supplemental layer or layers, the supplemental layer or layers may be applied to the lead fiber web at a position between the pair of rollers 6 and 6' and the pair of rollers 7 and 7' shown in FIG. 4, whereby a sound insulating sheet which has a structure such that both the lead fiber nonwoven fabric and the supplemental layer or layers are impregnated with a vinyl chloride polymer, is obtained. Alternatively, when a sound insulating sheet, which has a structure such that the supplemental layer or layers are adherent to the vinyl chloride polymer-impregnated lead fiber nonwoven fabric, is desired, the supplemental layer or layers may be applied to the lead fiber at a position either between the pair of rollers 6 and 6' and the pair of rollers 7 and 7', or immediately upstream to the pair of rollers 11 and 12 or the pair of rollers 13 and 14.

The sound insulating material of the present invention has various functions, other than as sound insulators, for example, as a vibration damping sheet, shields against electromagnetic waves, X-ray and radioactive rays, and an antistatic sheet.

The following examples are given to further illustrate the invention, but it is not intended to limit the invention thereto. In the example, percentages and parts are by weight unless otherwise specified and sound transmission loss was determined in the following manner. A sound insulating sheet specimen of 60 × 60cm size was stretched on a frame provided in the opening of a wall between two adjacent rooms, one being the sound generating room and the other being the sound receiving room, and sealed at the periphery of the sheet specimen.

The sound levels in the two rooms were measured with and without the sheet specimen to determine the sound transmission loss.

EXAMPLE 1

Using the apparatus shown in FIGS. 4 through 7, a sound insulating sheet was continuously manufactured as follows.

An alloy composed of 99.96% lead, 0.02% antimony and 0.02% tin was melted at 400° C and extruded into the atmosphere through a spinblock 2 provided with a stainless steel spinneret having 64 orifices each being of 180 microns in diameter. The extrusion pressure and rate were 1.0 atm./cm$^2$ and 4.2 kg/min., respectively. Air is blown transversely against a bundle of the lead fibers as the fibers are being extruded, by using a blower (not shown in FIG. 2), whereby the bundle of the fibers was spread so as to fall onto a first slanting guide plate, said bundle forming a spread of approximately 40 cm in width upon contacting said plate 4. The spread bundle of fibers are made into a web having a width of about one meter and a zig-zag configuration when they fall from the first slanting guide plate 4 onto a second slanting guide plate 5. Then, the spread bundle of fibers in the form of the web is shaken again from said plate 5 onto a polyvinyl chloride sheet withdrawn at a rate of 1.5 m/min. from a roll 18. The polyvinyl chloride sheet had a width of 105 cm and a thickness of 0.4 mm. The lead fiber web and the polyvinyl chloride sheet were pressed together by a pair of rollers 8 and 9 to form a lead fiber web having a surface density of approximately 2.5 kg/m$^2$. Another polyvinyl chloride sheet having a width of 105 cm and a thickness of 0.4 mm, withdrawn from a roll 19, was superposed on the lead fiber web, and, then, the superposed product was heated by heating rollers 9, 10, 11 and 12, maintained at 120° C, 175° C, 135° C and 175° C, respectively, thereby impregnating the lead fiber web with polyvinyl chloride. Then, the resin-impregnated web was pressed by a pair of rollers 13 and 14 and cooled by the roller 14 and roller 15, through which cold water was circulated. The cooled web was cut into pieces each of a size of one meter in width and 10 meters in length, and then the cut pieces were wound into rolls 20.

The lead fibers in the resulting sheets had an average diameter of approximately 160 microns and lengths of mainly from 5 to 15 cm. The sheets each had a thickness of approximately 1 mm, a specific gravity of 3.4, thus had a surface density of approximately 3.4 kg/m$^2$. Further, each sheet contained approximately 70% of the lead fibers. Because the lead fibers were in a state of uniform distribution and random disposition, as hereinbefore illustrated with reference to FIGS. 1A and 1B, the sheets were very flexible. The lead fibers were not exposed on the surfaces of the sheets, and, therefore, the surfaces were smooth to the touch. The polyvinyl chloride sheet used was a commercially available transparent sheet composed of approximately 70% of a polyvinyl chloride having an average polymerization degree of 1,100, approximately 30% of dioctyl phthalate plasticizer and a minor amount of other additives. The polyvinyl chloride-impregnated nonwoven lead fiber sheets exhibited a luminous transmittance of approximately 12% as determined by a light transmitting procedure using an integration sphere according to the Japanese Industrial Standard (hereinafter refered to as "JIS" for brevity) K6714.

The transmission loss of the polyvinyl chloride-impregnated nonwoven lead fiber sheets was from 2 to 5 dB larger than the theoretical value calculated from the Mass Law, as illustrated with reference to FIG. 3. The other characteristics of the sheets were as follows.

| | | |
|---|---|---|
| Tensile strength, longitudinal direction | 16 kg/3 cm | According to JIS K 6722, para. 9.3 |
| transverse direction | 18 " | |
| Elongation at break, longitudinal direction | 40% | According to JIS K 6722, para. 9.3 |
| transverse direction | 48% | |
| Tear strength, longitudinal direction | 3.6 kg | According to JIS K 6722, para. 9.4 |
| transverse direction | 3.3 kg | |
| Thermal stability, retension of tensile strength and elongation | 100% | Measured after maintenance at 80° C for 200 hours |
| Flame-proofness | Grade 3 | According to JIS A 1322* |
| Fire retardance | 29.5% | By oxygen index method according to JIS K 7201** |
| Weather resistance, Retention of tensile strength, | | Measured after 200 hour exposure by weatherometer |
| longitudinal direction | 114% | |
| transverse direction | 103% | |
| Retention of elongation, longitudinal direction | 106% | |
| transverse direction | 98% | |

Notes: *Testing method for incombustibility of thin materials for buildings.
**Testing method for flammability of polymeric materials using the Oxygen Index Method.

A conventional sound insulating lead metal sheet having a thickness of 0.3 mm and a surface density of 3.4 kg/m$^2$ proved to possess a tensile strength of 12 kg/3 cm and a tear strength of 0.5 kg.

The vibration-damping properties of the resin-impregnated nonwoven lead fiber sheets were also tested. The resonance sharpness thereof was 3.5, whereas the resonance sharpnesses (Q value) of the above-mentioned lead metal sheet and of an iron sheet having a thickness of 1.6 mm were 67 and $1.8 \times 10^4$, respectively. The loss modulus (E/Q, E=Young modulus) was $2.8 \times 10^3$ kg/cm$^2$, whereas the loss modulus; of the lead metal sheet and the iron sheet were $2.4 \times 10^3$ and $1.16 \times 10^2$, respectively. The above data show that the resin-impregnated nonwoven lead fiber sheet of the invention is useful as a vibration damping sheet.

EXAMPLE 2

Following the general procedures set forth in Example 1, a polyvinyl chloride-impregnated nonwoven lead fiber fabric sheet was manufactured wherein pure lead was used instead of the lead-antimony-tin alloy and wherein the amount of pure lead was 79% based on the weight of the resultant resin-impregnated sheet. The resin-impregnated sheet had a thickness of 2 mm and a specific gravity of 4.3. The lead fibers in the resin-impregnated sheet were mainly from 30 to 50 cm in length.

The resin-impregnated sheet had a surface density of 8.6 kg/m$^2$ and a transmission loss of 30 dB at 1,000 Hz.

EXAMPLE 3

Following the general procedures set forth in Example 1, a polyvinyl chloride-impregnated nonwoven lead fiber fabric sheet was manufactured from a lead alloy similar to that used in Example 1. Polyvinyl chloride sheets used were each of a thickness of 0.2 mm. The web passed through the press rollers 6 and 6' has a surface density of 0.5 kg/m².

The resultant resin-impregnated sheet had a thickness of approximately 0.5 mm, a specific gravity of 2.0, and thus had a surface density of approximately 1 kg/m². The lead fibers in the resin-impregnated sheet were mainly from 5 to 15 cm in length. The content of the lead fibers in the resin-impregnated sheet was 50%. The resin-impregnated sheet exhibited a loss transmittance of 13 dB at 1,000 Hz.

EXAMPLE 4

Following procedures approximately similar to those set forth in Example 1, a polyvinyl chloride-impregnated nonwoven lead fiber fabric sheet was manufactured from an alloy composed of 99.9% lead and 0.1% antimony. Immediately downstream from the pair of rollers 7 and 7' in the arrangement shown in FIG. 2, two polyester fiber spun bonded fabrics, each having a width of 110 m and a surface density of 40 g/m², were superposed on both sides of the lead fiber web combined with the two polyvinyl chloride sheets withdrawn from rolls 18 and 19. The temperature of rollers 9, 10, 11 and 12 was set at 120° C, 163° C, 163° C and 163° C, respectively, and a far infrared heater (not shown in FIG. 2) was provided immediately upstream to the pair of rollers 11 and 12 for the promotion of heating.

The resultant resin-impregnated sheet had a thickness of approximately 1 mm, a specific gravity of 3.5, and thus exhibiting a surface density of approximately 3.5 kg/m². A part of the polyvinyl chloride oozed out through the polyester fiber spun bonded fabrics on the surfaces of the sheet during the step of heat pressing, and thus, the resin-impregnated sheet was of a structure such that the two polyester fiber spun bonded fabrics and the nonwoven lead fiber fabric were embedded in a polyvinyl chloride phase. The resin-impregnated sheet was satisfactorily flexible although somewhat stiff as compared with the sheet obtained in Example 1.

The sound insulation property of the sheet was approximately similar to that in Example 1. The other properties were as follows. The procedures for determining the following properties were the same as those set forth in Example 1.

| | |
|---|---|
| Tensile strength, | |
| longitudinal direction | 44 kg/3 cm |
| transverse direction | 35 " |
| Elongation at break, | |
| longitudinal direction | 27% |
| transverse direction | 34% |
| Tear strength, | |
| longitudinal direction | 4.6 kg |
| transverse direction | 4.5 kg |
| Thermal stability, | |
| Retention of tensile | |
| strength and elongation | 100% |
| Flame-proofness | Grade 3 |
| Fire retardance | 28.4% |
| Luminous transmittance | 8.7% |
| Weather resistance, | |
| Retention of tensile strength | |
| longitudinal direction | 76% |
| transverse direction | 96% |
| Retention of elongation | |
| longitudinal direction | 66% |
| transverse direction | 73% |

As seen from the above-listed data, the resin-impregnated sheet of this example is superior in mechanical properties, particularly in tensile strength, if compared to the sheet of Example 1. The weather resistance of the sheet of this Example expressed in terms of the percentage of retention of tensile strength, is poor as compared with that of the sheet of Example 1, whereas the tensile strength of the sheet of this Example after exposure to the weatherometer was still larger than that of the sheet of Example 1. It is presumed that the poor weather resistance of the sheet of this Example is due to the deterioration of the low-melting polymer used as an adhesive for the polyester fiber spun bonded fabrics.

The resonance sharpness (Q value) and the loss modulus of the sheet of this example were 3.9 and $2.6 \times 10^3$ kg/cm², respectively.

EXAMPLE 5

Following the general procedures set forth in Example 1, a polyvinyl chloride-impregnated nonwoven lead fiber fabric sheet was manufactured wherein a polyvinyl chloride sheet with a high flame retardant rating was used as the sheet withdrawn from roll 18, and, further, a polyester fiber woven fabric (500 × 500D/18 × 20) was used instead of the polyvinyl chloride sheet withdrawn from roll 19. The composite sheet so formed, composed of a nonwoven lead fiber fabric, polyvinyl chloride and a polyester fiber woven fabric, was coated on both surfaces with a polyvinyl chloride compound with a high flame retardant rating by a conventional topping procedure. The thickness of each of the coated polyvinyl chloride layers was approximately 0.2 mm.

The resultant sheet had a thickness of 1.2 mm a specific gravity of 3.1, and thus had a surface density of 3.7 kg/m². The lead fibers contained therein had a length of approximately 5 cm to approximately 20 cm, and their content was 68% based on the weight of the resultant sheet. The sheet exhibited a tensile strength of 93 kg/3 cm in the longitudinal direction and a tensile strength of 103 kg/3 cm in the transverse direction, a tear strengths of 14 kg in the longitudinal direction and a tear strength of 18 kg in the transverse direction, and a flame-proofness of grade 2.

The sheet of this example was tested for its sound insulating property in the construction field. The noise level could be reduced by 15 to 20 dB(A). This sound insulating effect is remarkably improved when compared with that of a conventional polyvinyl chloride-impregnated nylon duck.

COMPARATIVE EXAMPLE 1

Following the general procedures set forth in Example 1, a polyvinyl chloride-impregnated nonwoven lead fiber fabric sheet was manufactured. In this example, a spinneret having 81 orifices was used and the extrusion pressure was changed to approximately 3 to 4 kg/cm², thereby forming a nonwoven lead fiber fabric having a surface density of approximately 6.2 kg/m². Further, the thickness of each of the polyvinyl chloride sheets withdrawn from rolls 18 and 19 was changed to 0.2 mm.

The resultant sheet had a thickness of 1.2 mm, a specific gravity of 5.6, and thus had a surface density of 6.7 kg/m². The lead fibers contained therein had a length of mainly 10 to 30 cm, and their content was 92% based on the weight of the resultant sheet. The polyvinyl chloride did not sufficiently fill the spaces between individual lead fibers of the nonwoven web in the step of heat pressing, and therefore, the two polyvinyl chloride sheets were liable to be separated from the nonwoven lead fiber fabric. The tensile strength and the tear strength of the sheet were approximately 7.6 kg/3 cm and 1.1 kg, respectively, which are far less than those of the sheet of the invention.

On one hand, the above-mentioned sheet was further heat-pressed at a temperature of 170° C and at a pressure of 40 kg/cm² by using a 70-ton hot press to obtain a sheet having a thickness of approximately 1 mm and a surface density of 6.7. The lead fibers were exposed in the forms of flat blocks in places on the surface of the resultant sheet. The appearance was unattractive.

On the other hand, the above-mentioned nonwoven lead fiber fabric was coated on one surface with a polyvinyl chloride paste at a coating build-up of 0.5 kg/m² by the topping process. This amount of coating was insufficient for obtaining a sheet wherein the polyvinyl chloride paste was uniformly distributed over the entire surface of the sheet. The resultant sheet was somewhat porous and poor in its sound insulation effect.

What we claim is:

1. A nonporous flexible sound insulating sheet composed of 50 to 90% by weight of a nonwoven lead fiber fabric and 10 to 50% by weight of a vinyl chloride polymer reinforcing material, said reinforcing material filling the spaces between individual lead fibers of the nonwoven fabric to secure the individual lead fibers in their place; said lead fibers being substantially uniformly distributed in the nonwoven fabric and being disposed such that the axes of the lead fibers extend, as a whole, substantially at random in all directions, and such that the lead fibers are not exposed on the surface of the sound insulating sheet, said sound insulating sheet having a thickness of 0.3 to 2.0 mm and a specific gravity of 2.0 to 6.5.

2. A nonporous flexible sound insulating sheet as claimed in claim 1 wherein said lead fibers are made of a lead alloy consisting essentially of 90 to 99.9% by weight of lead and 0.01 to 10% by weight of at least one metal selected from the group consisting of tin and antimony.

3. A nonporous flexible sound insulating sheet as claimed in claim 1 wherein said lead fibers have a length of 0.5 to 100 cm.

4. A sound insulating laminated sheet comprising a layer of the nonporous flexible sound insulating sheet claimed in claim 1 and at least one layer of a knitted fabric, a woven fabric, a nonwoven fabric or a metal foil, the latter layer being adherent to either one side or both sides of said layer of the nonporous flexible sound insulating sheet.

5. A sound insulating laminated sheet as claimed in claim 4, which further comprises at least one vinyl chloride polymer layer adherent to the outer surface or surfaces of said layer of a knitted fabric, a woven fabric, a nonwoven fabric or a metal foil.

* * * * *